(12) United States Patent
Gardiner et al.

(10) Patent No.: US 6,707,611 B2
(45) Date of Patent: Mar. 16, 2004

(54) OPTICAL FILM WITH VARIABLE ANGLE PRISMS

(75) Inventors: Mark E. Gardiner, Santa Rosa, CA (US); Sanford Cobb, Lakeland, MN (US); Kenneth A. Epstein, St. Paul, MN (US); Wade D. Kretman, Afton, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/353,888

(22) Filed: Jan. 29, 2003

(65) Prior Publication Data

US 2003/0112521 A1 Jun. 19, 2003

Related U.S. Application Data

(63) Continuation of application No. 10/047,872, filed on Jan. 16, 2002, now Pat. No. 6,560,026, which is a continuation of application No. 09/415,873, filed on Oct. 8, 1999, now Pat. No. 6,356,391.

(51) Int. Cl.[7] .............................................. G02B 27/10
(52) U.S. Cl. ........................ 359/619; 359/627; 359/628
(58) Field of Search ................................. 359/619, 620, 359/625–628, 638, 640; 345/36, 901; 349/62

(56) References Cited

U.S. PATENT DOCUMENTS

| 586,214 A | 7/1897 | Basquin |
| 586,220 A | 7/1897 | Basquin |
| 586,247 A | 7/1897 | Soper |
| 586,248 A | 7/1897 | Soper |
| 586,249 A | 7/1897 | Soper |
| 586,251 A | 7/1897 | Soper |
| 586,252 A | 7/1897 | Soper |
| 607,792 A | 7/1898 | Winger |
| 650,209 A | 5/1900 | White |
| 713,182 A | 11/1902 | Wadsworth |
| 719,066 A | 1/1903 | Wadsworth |
| 720,386 A | 2/1903 | Wadsworth |
| 720,987 A | 2/1903 | Wadsworth |

(List continued on next page.)

FOREIGN PATENT DOCUMENTS

| DE | 44 11 206 A | 10/1995 | ........... F21V/11/02 |
| EP | 0 167 721 A1 | 1/1986 | ............. F21V/8/00 |

(List continued on next page.)

OTHER PUBLICATIONS

IBM Technical Disclosure Bulletin, vol. 29, No. 11, *Backlighting for Liquid Crystal Display*, Apr. 1987.

(List continued on next page.)

*Primary Examiner*—Georgia Epps
*Assistant Examiner*—Alicia Harrington
(74) *Attorney, Agent, or Firm*—Stephen W. Buckingham

(57) ABSTRACT

An optical turning film has a first surface including an array of prisms. The array has a plurality of first prisms, with each of the first prisms having a first prism configuration, and a plurality of second prisms, with each of the second prisms having a second prism configuration different from the first prism configuration. The optical film also has a second surface opposing the first surface, and light rays incident to the first surface are directed by the plurality of first prism and the plurality of second prisms along a direction substantially parallel to a viewing axis.

5 Claims, 5 Drawing Sheets

U.S. PATENT DOCUMENTS

| | | | |
|---|---|---|---|
| 752,429 A | 2/1904 | Wadsworth | |
| 755,196 A | 3/1904 | Wadsworth | |
| 818,208 A | 4/1906 | Wadsworth | |
| 2,099,034 A | 11/1937 | Rolph | 240/106 |
| 2,115,178 A | 4/1938 | Rolph | 240/106 |
| 2,143,148 A | 1/1939 | Guth | 240/78 |
| 2,179,863 A | 11/1939 | Rolph | 88/60 |
| 2,223,841 A | 12/1940 | Biller | 240/78 |
| 2,347,665 A | 5/1944 | Christensen et al. | 240/2 |
| 2,398,507 A | 4/1946 | Rolph | 240/9 |
| 2,714,816 A | 8/1955 | Pennell | 72/41 |
| 2,844,998 A | 7/1958 | Vincent | 88/60 |
| 3,721,818 A | 3/1973 | Stahlhut | 240/106 |
| 3,735,124 A | 5/1973 | Stahlhut | 240/106 |
| 3,994,564 A | 11/1976 | Somogyi | 350/160 |
| 4,053,208 A | 10/1977 | Kato et al. | 350/117 |
| 4,127,693 A | 11/1978 | Lemelson | 428/163 |
| 4,233,651 A | 11/1980 | Fabbri | 362/33 |
| 4,242,723 A | 12/1980 | Fabbri et al. | 362/33 |
| 4,298,249 A | 11/1981 | Gloor et al. | 350/338 |
| 4,337,759 A | 7/1982 | Popovich et al. | 126/438 |
| 4,416,515 A | 11/1983 | Funada et al. | 350/350 |
| 4,450,509 A | 5/1984 | Henry | 362/216 |
| 4,486,070 A * | 12/1984 | Benton | 359/627 |
| 4,542,449 A | 9/1985 | Whitehead | 362/330 |
| 4,755,921 A | 7/1988 | Nelson | 362/307 |
| 4,804,253 A | 2/1989 | Stewart | 350/330 |
| 4,870,484 A | 9/1989 | Sonehara | 358/59 |
| 4,906,070 A | 3/1990 | Cobb, Jr. | 350/286 |
| 4,984,144 A | 1/1991 | Cobb, Jr. et al. | 362/339 |
| 5,005,108 A | 4/1991 | Pristash et al. | 362/31 |
| 5,022,728 A | 6/1991 | Fandrich | 350/96.1 |
| 5,040,883 A | 8/1991 | Cobb, Jr. et al. | 350/452 |
| 5,079,675 A | 1/1992 | Nakayama | 362/31 |
| 5,126,882 A | 6/1992 | Oe et al. | 359/619 |
| 5,128,783 A | 7/1992 | Abileah et al. | 359/49 |
| 5,151,801 A | 9/1992 | Hiroshima | 359/40 |
| 5,161,041 A | 11/1992 | Abileah et al. | 359/40 |
| 5,190,370 A | 3/1993 | Miller et al. | 362/340 |
| 5,206,746 A | 4/1993 | Ooi et al. | 359/40 |
| 5,262,928 A | 11/1993 | Kashima et al. | 362/31 |
| 5,280,371 A | 1/1994 | McCartney, Jr. et al. | 359/40 |
| 5,303,322 A | 4/1994 | Winston et al. | |
| 5,394,255 A | 2/1995 | Yokota et al. | 359/49 |
| 5,396,350 A | 3/1995 | Beeson et al. | 359/40 |
| 5,402,324 A | 3/1995 | Yokoyama et al. | 362/19 |
| 5,467,208 A * | 11/1995 | Kokawa et al. | 349/67 |
| 5,467,417 A | 11/1995 | Nakamura et al. | 385/36 |
| 5,499,138 A | 3/1996 | Iba | 359/569 |
| 5,521,797 A | 5/1996 | Kashima et al. | 362/31 |
| 5,550,657 A | 8/1996 | Tanaka et al. | 359/49 |
| 5,552,907 A | 9/1996 | Yokota et al. | 359/49 |
| 5,587,816 A | 12/1996 | Gunjima et al. | 349/62 |
| 5,592,332 A | 1/1997 | Nishio et al. | 359/619 |
| 5,594,830 A | 1/1997 | Winston et al. | 385/146 |
| 5,598,280 A | 1/1997 | Nishio et al. | 349/57 |
| 5,600,455 A | 2/1997 | Ishikawa et al. | 349/57 |
| 5,600,462 A | 2/1997 | Suzuki et al. | 349/112 |
| 5,627,926 A | 5/1997 | Nakamura et al. | 385/36 |
| 5,661,603 A | 8/1997 | Hanano et al. | |
| 5,696,627 A | 12/1997 | Benson et al. | 359/529 |
| 5,711,589 A | 1/1998 | Oe et al. | 362/31 |
| 5,735,590 A | 4/1998 | Kashima et al. | 362/31 |
| 5,739,931 A | 4/1998 | Zimmerman et al. | 359/40 |
| 5,771,328 A * | 6/1998 | Wortman et al. | 385/146 |
| 5,779,337 A | 7/1998 | Saito et al. | 362/31 |
| 5,808,709 A | 9/1998 | Davis et al. | 349/65 |
| 5,828,488 A | 10/1998 | Ouderkirk et al. | 359/487 |
| 5,831,697 A | 11/1998 | Evanicky et al. | 349/62 |
| 5,914,759 A | 6/1999 | Higuchi et al. | 349/57 |
| 5,917,664 A * | 6/1999 | O'Neill et al. | 359/831 |
| 5,919,551 A * | 7/1999 | Cobb et al. | 428/156 |
| 6,027,222 A | 2/2000 | Oki et al. | 362/31 |
| 6,044,196 A | 3/2000 | Winston et al. | 385/146 |
| 6,072,551 A | 6/2000 | Jannson et al. | 349/64 |
| 6,130,730 A | 10/2000 | Janson et al. | 349/65 |
| 6,356,391 B1 * | 3/2002 | Gardiner et al. | 359/628 |
| 6,560,026 B2 * | 5/2003 | Gardiner et al. | 359/628 |

FOREIGN PATENT DOCUMENTS

| | | | |
|---|---|---|---|
| EP | 0 534 140 A1 | 3/1993 | F21V/8/00 |
| EP | 0 770 818 A2 | 5/1997 | F21V/8/00 |
| EP | 0 787 942 A2 | 8/1997 | F21V/8/00 |
| FR | 2 606 861 A1 | 5/1988 | F21S/1/00 |
| GB | 806124 | 12/1958 | |
| JP | 52-6496 | 1/1977 | G09F/9/00 |
| JP | 54-127299 | 10/1979 | G09F/9/00 |
| JP | 60-70601 | 4/1985 | F21V/5/02 |
| JP | 60-73618 | 4/1985 | G02F/1/133 |
| JP | 61-11782 | 1/1986 | G09F/9/00 |
| JP | 61-158367 | 7/1986 | G09F/9/00 |
| JP | 63-10402 | 1/1988 | F21V/5/02 |
| JP | 2-28842 | 6/1990 | G02B/5/00 |
| JP | 2-176629 | 7/1990 | G02F/1/1335 |
| JP | 2-214822 | 8/1990 | G02F/1/1335 |
| JP | 2-184020 | 8/1991 | G02G/1/1335 |
| JP | 3-184021 | 8/1991 | G02F/1/1335 |
| JP | 3-191329 | 8/1991 | G02F/1/1335 |
| JP | 6-18707 | 1/1994 | G02B/5/02 |
| JP | 6-82635 | 3/1994 | G02B/6/00 |
| JP | 6-242322 | 9/1994 | G02B/6/00 |
| JP | 2559579 | 12/1996 | G09F/9/00 |
| JP | 9-5528 | 1/1997 | G02B/6/00 |
| WO | WO 89/02606 | 3/1989 | G02B/5/02 |
| WO | WO 96/27757 | 10/1996 | F21V/5/02 |
| WO | WO 98/50806 | 11/1998 | G02B/5/02 |
| WO | WO 00/42451 | 7/2000 | G02B/5/04 |

OTHER PUBLICATIONS

IBM Technical Disclosure Bulletin, vol. 31, No. 2, *Flat Panel Backlight Reflecting Device*, Jul. 1988.

IBM Technical Disclosure Bulletin, vol. 33, No. 1B, *Polarized Backlight for Liquid Crystal Display*, Jun. 1990.

IBM Technical Disclosure Bulletin, vol. 33, No. 9, *High Efficiency Back Light for LCD*, Feb. 1991.

Patent Abstracts of Japan, vol. 007, No. 090 (P–191). Apr. 14, 1983 & JP 58 017402 A (Kunishiro Kanagata Kogto KK), Feb. 1, 1983.

Patent Abstracts of Japan, vol. 1997, No. 03, Mar. 31, 1997 & JP 08 313710 A (Mitsubishi Rayon Co Ltd), Nov. 29, 1996.

* cited by examiner

OPTICAL FILM WITH VARIABLE ANGLE PRISMS

RELATED APPLICATIONS

This application is a continuation of application Ser. No. 10/047,872, filed Jan. 16, 2002, now U.S. Pat. No. 6,560,026, which is a continuation of application Ser. No. 09/415,873, filed Oct. 8, 1999, now U.S. Pat. No. 6,356,391.

BACKGROUND OF THE INVENTION

1. Field of the Invention

The invention relates generally to light transmissive optical films, and more particularly, the invention relates to an optical film with an array of variable angle prisms.

2. Description of the Related Technology

Backlit display devices, such as liquid crystal display (LCD) devices, commonly use a wedge-shaped lightguide. The wedge-shaped lightguide couples light from a substantially linear source, such as a cold cathode fluorescent lamp (CCFL), to a substantially planar output. The planar output is then coupled to the LCD.

The performance of a display device is often judged by its brightness. From a subjective standpoint relatively small increases in overall brightness are not easily perceived by the end user of the display device, but it is possible to measure relatively small increases in brightness objectively. While not directly appreciated by the end user, a display with an objectively measured increase in overall brightness of only a small percentage, for example, perhaps as little as 1 percent, is perceived as being significantly better by the designer of the product using the display. This is because the designer can allocate less power to the display device, yet still achieve an acceptable level of brightness. For battery powered, portable devices, this translates to longer running times.

The alternatives for increasing display brightness include using more or brighter light sources. Counter to the ability to decrease the power allocation to the display device, additional light sources and/or brighter light sources consume more energy, which for portable devices this correlates to decreased battery life. Also, adding light sources to the device may increase the product cost and can lead to reduced reliability of the device.

Brightness is also enhanced by more efficiently using the light that is available within the display device, i.e., to direct more of the available light within the display along a preferred viewing axis. A number of mechanisms have been employed within display devices to improve display device efficiency. For example, brightness enhancing films having prismatic structures are frequently used to direct light that would otherwise not be viewed along the viewing axis. A typical flat panel display device may use several different films to provide an overall bright, high contrast display with substantially uniform output along the preferred viewing directions. Surface diffusers or bulk diffusers are sometimes used to mask defects in the output of the lightguide, but most diffusers scatter light from the viewing axis and therefore reduce on-axis brightness.

Lightguide improvements have also contributed to improved brightness in display devices. Typical lightguides extract light by diffusion and may be enhanced by geometric recycling. Light rays entering the lightguide encounter diffusing elements, typically a pattern of white dots applied to a surface of the lightguide, and are diffusively extracted by scattering from the lightguide. Other light rays are totally internally reflected within the lightguide until encountering a diffusing element. Losses are encountered in these processes, and because the light is diffusely extracted, without any collimation, on-axis brightness is lower. With enhancement, the diffuse light rays may be directed more on axis, in a quasi-collimation process, which results in enhanced on-axis brightness.

Another method of extracting light from a lightguide is by use of frustrated total internal reflection (TIR). In one type of frustrated TIR the lightguide has a wedge shape, and light rays incident on a thick edge of the lightguide are totally internally reflected until achieving critical angle relative to the top and bottom surfaces of the lightguide. These sub-critical angle light rays are then extracted, or more succinctly refract from the lightguide, at a glancing angle to the output surface. To be useful for illuminating a display device, these light rays must then be turned substantially parallel to a viewing, or output, axis of the display device. This turning is usually accomplished using a turning lens or turning film.

A turning lens or turning film typically includes prism structures formed on an input surface, and the input surface is disposed adjacent the lightguide. The light rays exiting the lightguide at the glancing angle, usually less than 30° to the output surface, encounter the prism structures. The light rays are refracted by a first surface of the prism structures and are reflected by a second surface of the prism structures such that they are directed by the turning lens or film in the desired direction, e.g., substantially parallel to a viewing axis of the display.

An optical effect resulting from frustrated TIR lightguides not adequately compensated for in presently known display devices is referred to as ripple. Ripple is a periodic fluctuation in the luminance of the wedge light output. The fluctuation amplitude, spatial frequency and phase are largely determined by the wedge angle, input aperture and lamp coupling to the input aperture. The emergence angle and the location of emergence from the wedge maps directly onto a position on the input aperture and an emission angle from the input aperture. Thus, non-uniformities in the spatial and angular components of emission from the input aperture map into corresponding changes in the wedge output brightness. The result is an effect wherein the display has a bright and dark banded appearance parallel to the light source. The effect is most perceptible nearest to the lightguide entrance, but may be observed over the entire output surface.

Attempts to correct ripple, or essentially mask the appearance of ripple, include adding some form of optical power or scattering to the wedge structure to try and provide more uniform light extraction. However, these attempts have not proven entirely satisfactory.

SUMMARY OF THE INVENTION

In accordance with the invention, an optical film useful for reducing or eliminating ripple (luminance non-uniformity) is formed with an array of turning prisms formed on an input surface. The prisms are contained within the array in clusters of prisms that include prisms of two or more prism configurations.

In a first aspect of the invention, an optical turning film has a first surface including an array of prisms. The array has a plurality of first prisms, with each of the first prisms having a first prism configuration, and a plurality of second prisms, with each of the second prisms having a second prism configuration different from the first prism configuration. The optical film also has a second surface opposing the first surface, and light rays directed at a glancing angle to the first surface are directed by the plurality of first prisms and the plurality of second prisms through the optical turning film and are emitted from the second surface at an angle substantially parallel to a viewing direction of a display.

In another aspect of the invention, an optical turning film is a sheet of light transmissive optical film having a first surface and a second surface. A plurality of first light redirecting prisms and a plurality of second light redirecting prisms are formed in the first surface. The plurality of first light redirecting prisms and the plurality of second light redirecting prisms are arranged in an array of prisms on the first surface. The first light redirecting prisms have a first prism configuration, and the second light redirecting prisms have a second prism configuration, different from the first prism configuration. The plurality of first light redirecting prisms and the second plurality of light redirecting prisms are organized into a plurality of first prism groups and a plurality of second prism groups. The first prism groups and the second prism groups are arranged in the array in a pattern of first prisms and second prisms.

In still another aspect of the invention, an illumination device has a lightguide with an input surface and an output surface. Light rays incident on the input surface are refracted into the lightguide and propagate within the lightguide by TIR. These light rays then exit the output surface via frustrated TIR at a glancing angle to the output surface. A light source is coupled to the input surface to project the light rays on the input surface, and a turning film is disposed adjacent the output surface. The turning film has a first surface and a second surface opposing the first surface. An array of prisms is formed in the first surface of the turning film, and the array of prisms has a plurality of first prisms having a first prism configuration and a plurality of second prisms having a second prism configuration different from the first prism configuration. The array of prisms are arranged to redirect the light rays from the glancing angle to an angle substantially aligned with a viewing axis of the illumination device.

BRIEF DESCRIPTION OF THE DRAWINGS

The many advantages and features of the present invention will become apparent to one of ordinary skill in the art from the following detailed description of several preferred embodiments of the invention with reference to the attached drawings wherein like reference numerals refer to like elements throughout and in which.

DETAILED DESCRIPTION OF THE PREFERRED EMBODIMENTS

The present invention is described in terms of several preferred embodiments, and particularly, in terms of a turning film suitable for use in a backlighting system typically used in flat panel display devices, such as a laptop computer display or a desktop flat panel display. The invention, however, is not so limited in application and one of ordinary skill in the art will appreciate that it has application to virtually any optical system, for example, to projection screen devices and flat panel televisions. Therefore, the preferred embodiments described herein should not be taken as limiting of the broad scope of the invention.

Figure 1:
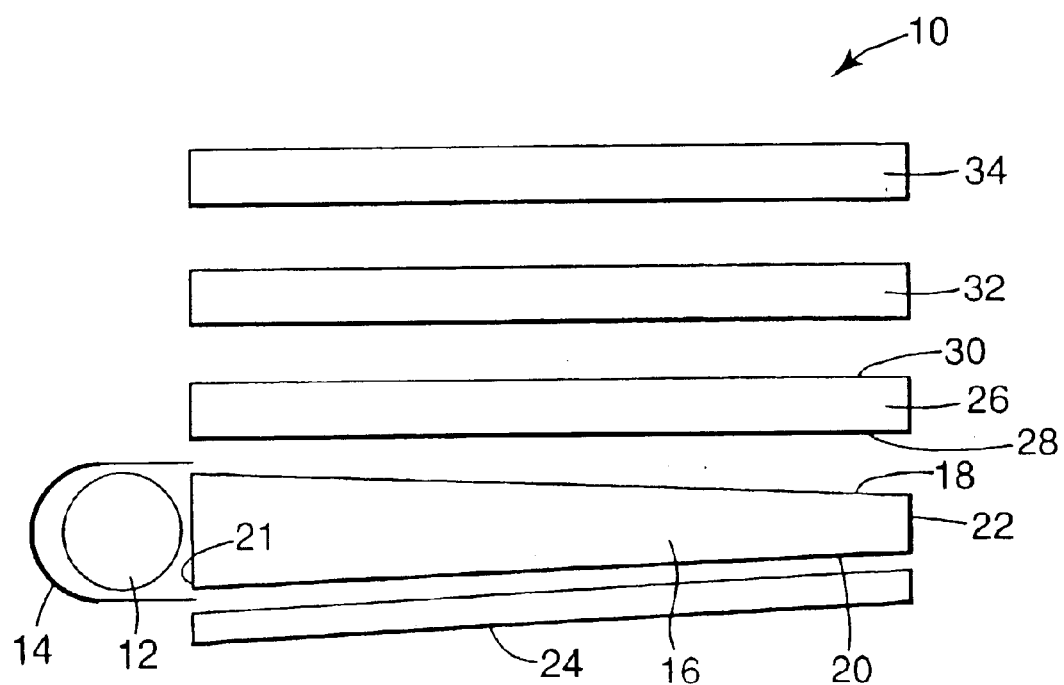
FIG. 1 is a schematic illustration of an illumination device adapted in accordance with the preferred embodiments of the invention.

Referring to FIG. 1, an illumination system 10 includes optically coupled a light source 12; a light source reflector 14; a lightguide 16 with an output surface 18, a back surface 20, an input surface 21 and an end surface 22; a reflector 24 adjacent the back surface 20; a first light redirecting element 26 with an input surface 28 and an output surface 30; a second light redirecting element 32; and a reflective polarizer 34. The lightguide 16 may be a wedge or a modification thereof. As is well known, the purpose of the lightguide is to provide for the uniform distribution of light from the light source 12 over an area much larger than the light source 12, and more particularly, substantially over an entire area formed by output surface 18. The lightguide 16 further preferably accomplishes these tasks in a compact, thin package.

The light source 12 may be a CCFL that is edge coupled to the input surface 21 of the lightguide 16, and the lamp reflector 14 may be a reflective film that wraps around the light source 12 forming a lamp cavity. The reflector 24 backs the lightguide 16 and may be an efficient back reflector, e.g., a lambertian or a specular film or a combination.

The edge-coupled light propagates from the input surface 21 toward the end surface 22, confined by TIR. The light is extracted from the lightguide 16 by frustration of the TIR. A ray confined within the lightguide 16 increases its angle of incidence relative to the plane of the top and bottom walls, due to the wedge angle, with each TIR bounce. Thus, the light eventually refracts out of each of the output surface 18 and the back surface 20 because it is no longer contained by TIR. The light refracting out of the back surface 20 is either specularly or diffusely reflected by the reflector 24 back toward and largely through the lightguide 16. The first light redirecting element 26 is arranged to redirect the light rays exiting the output surface 18 along a direction substantially parallel to a preferred viewing direction. The preferred viewing direction may be normal to the output surface 18, but will more typically be at some angle to the output surface 18.

Figure 2:
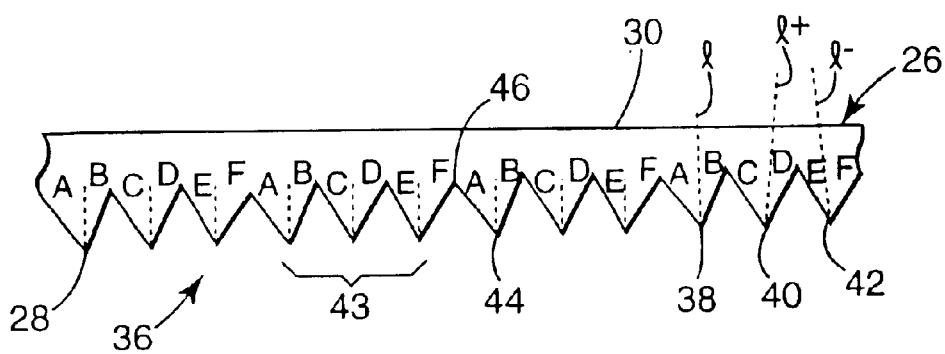
FIG. 2 is a schematic illustration of a turning film constructed in accordance with a preferred embodiment of the present invention.

As shown in FIG. 2, the first light redirecting element 26 is a light transmissive optical film where the output surface 30 is substantially planar and the input surface 28 is formed with an array 36 of prisms 38, 40 and 42. The second light redirecting element 32 may also be a light transmissive film, for example a brightness enhancing film such as the 3M Brightness Enhancement Film product (sold as BEFIII) available from Minnesota Mining and Manufacturing Company, St. Paul, Minn. The reflective polarizer 34 may be an inorganic, polymeric, cholesteric liquid crystal reflective polarizer or film. A suitable film is the 3M Diffuse Reflective Polarizer film product (sold as DRPF) or the Specular Reflective Polarizer film product (sold as DBEF), both of which are available from Minnesota Mining and Manufacturing Company.

With more particular reference to FIG. 2, within array 36, each prism 38, 40 and 42 may be formed with differing side angles as compared to its respective neighbor prisms. That is, prism 40 may be formed with different side angles (angles C and D) than prism 38 (angles A and B), and prism 42 (angles E and F). As shown, prisms 38 have a prism angle, i.e., the included angle, equal to the sum of the angles A and B. Similarly, prisms 40 have a prism angle equal to the sum of the angles C and D, while prisms 42 have a prism angle equal to the sum of the angles E and F. While array 36 is shown to include three different prism structures based upon different prism angle, it should be appreciated that virtually any number of different prisms may be used.

Prisms 38, 40 and 42 may also be formed with a common prism angle but with a varied prism orientation. A prism axis "1" is illustrated in FIG. 2 for prism 38. The prism axis 1 may be arranged normal to the output surface 30, as shown for prism 38, or at an angle to the output surface either toward or away from the light source as illustrated by phantom axes "$1_+$" and "$1_-$", respectively, for prisms 40 and 42.

Prisms 38, 40 and 42 may be arranged within array 36 as shown in FIG. 2 in a regular repeating pattern or clusters 43 of prisms, and while the array 36 is not shown to have like prisms adjacent like prisms, such a configuration may also be used. Moreover, within the array 36, the prisms 38, 40 and 42 may change continuously from a first prism configuration, such as prism configuration 38, to a second prism configuration, such as prism configuration 40, and so on. For example, the prism configuration may change in a gradient manner from the first prism configuration to the second prism configuration. Alternatively, the prisms may change in a step-wise manner, similar to the configuration shown in FIG. 2. Within each cluster 43, the prisms have a prism pitch, which is selected to be smaller than the spatial ripple frequency. Likewise, the clusters may have a regular cluster pitch.

Figure 3:
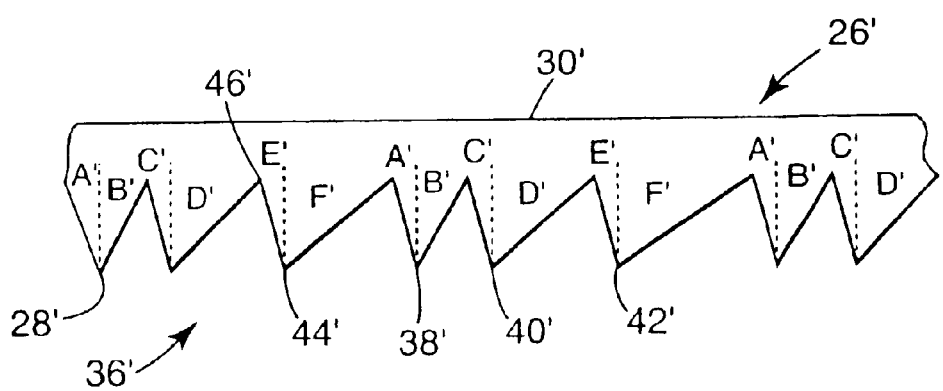
FIG. 3 is a schematic illustration of a turning film constructed in accordance with an alternate preferred embodiment of the present invention.

While the array 36 shown in FIG. 2 has prisms having a symmetric configuration, an array of prisms, such as array 36' shown in FIG. 3 formed in light redirecting element 26', may be used. Referring then to FIG. 3, in the array 36', prisms 38', for example, has angle A' unequal to angle B'. Similarly for prisms 40' and 42', angle C' is unequal to angle A' and angle D', and angle E' is unequal to either of angle A', angle C' or angle F'. The array 36' may be advantageously formed using a single diamond cutting tool of a predetermined angle, and tilting the tool for each cut producing prisms of differing prism angle and symmetry. However, it will be appreciated that with the use of a single cutting tool, the prism angles will be the same, i.e., A+B=C+D=E+F.

It is contemplated that as few as two different prism configurations may be used and arranged in clusters within the array 36, although as many prism sizes as necessary to accomplish a modification of the output profile from the lightguide 16 may be used. One purpose of the prism side angle variation is to spread and add variable amounts of optical power into the first light redirecting element 26. The varying configuration of prisms 38, 40 and 42 serves to provide substantially uniform sampling of the input aperture of the lightguide, which minimizes non-uniformities in the light extracted from the lightguide 16. The net result is an effective minimization of the ripple effect particularly near the entrance end 21 of the lightguide 16.

Figure 4:
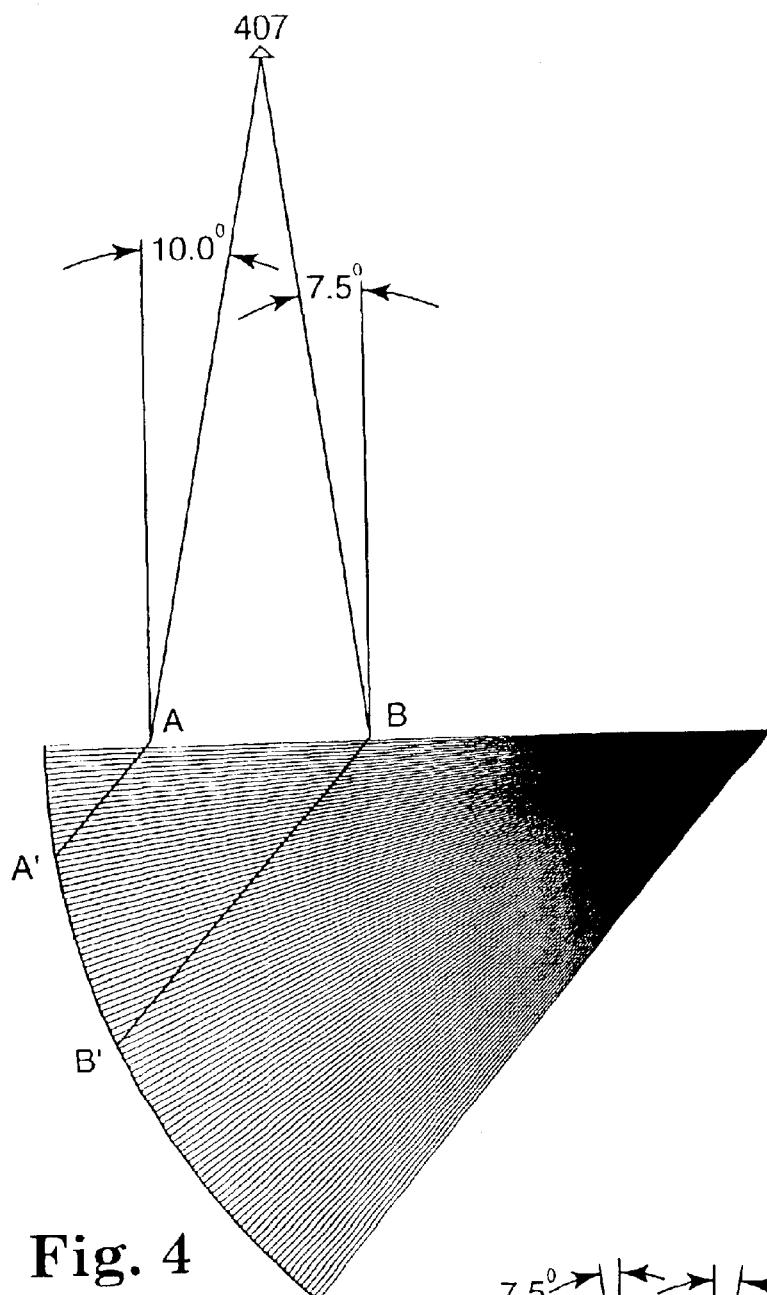
FIG. 4 is a diagram illustrating light rays propagating in an unfolded TIR lightguide.

Referring to FIG. 4 there is shown an unfolded view of a light path confined between two non-parallel mirror surfaces, for example, the TIR mirror surfaces in a wedge lightguide. One can represent a ray undergoing multiple TIR reflections as a straight line passing through multiple images of the lightguide surfaces. The fan-like structure is thus constructed from a series of wedge cross-sections stacked together, where the left boundary consists of the input surface of the lightguide and its reflected images. As light rays move away from the input surface, the confinement angle subtended at each mirror plan increases by an amount equal to the wedge angle. The top boundary represents a light extraction surface, either the top or bottom of the lightguide, where light emerges from the lightguide into air by the frustration of TIR. Viewing the lightguide in this manner, the light paths are straight and the number of TIR reflections is easy to count. It also permits one to trace an extracted ray back to its point of origin on the input pupil.

Light emits from the wedge over a range of angles starting at about 5° up to about 23°. The lower number is the onset of frustrated TIR transmission, just after the confinement angle exceeds the TIR limit. The larger angle represents the cutoff of intensity due to depletion from multiple bounces at increasing confinement angles. The precise range of extraction angles depends upon the wedge angle and optical index.

Figure 4A:
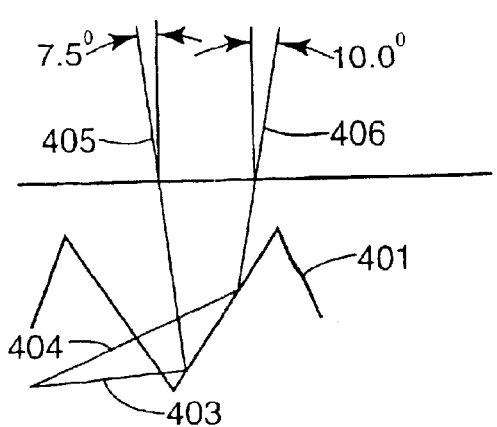
FIG. 4a is a schematic illustration of light rays exiting a lightguide and being turned by a turning lens.

In FIG. 4a, light rays 403 and 404 are extracted and then turned toward an observer by a turning lens having identical contiguous prisms 401. Light ray 403 emerges at about 5° relative to the surface (85° from normal) approximately the lower limit of emergent light pattern, and is turned by prism 401 into ray path 405, approximately −7.5° to the normal. Light ray 404 emerges at about 23° (67° from normal), the upper limit of the emergent light pattern, and is turned by prism 401 into ray path 406, approximately 10° to the normal.

If light rays 403 and 405 emit from points B and A, respectively, on the emission surface, then an observer 407 positioned at the vertex of light rays 405 and 406 sees the full range of the emitted light pattern between points A and B. Light rays 401 and 402, internal to the lightguide, point back to the input surface of the wedge. We see that the points of origin for these external rays are separated by 20 input pupil widths on the left boundary of the fan. Hence, as the observer 407 scans from point A to point B, he sees 20 images of the wedge-input pupil. If the light coupling, from the lamp to the input pupil, is non-uniform, either spatially or in angle, then the non-uniformity is observed as a ripple pattern.

Figure 5:
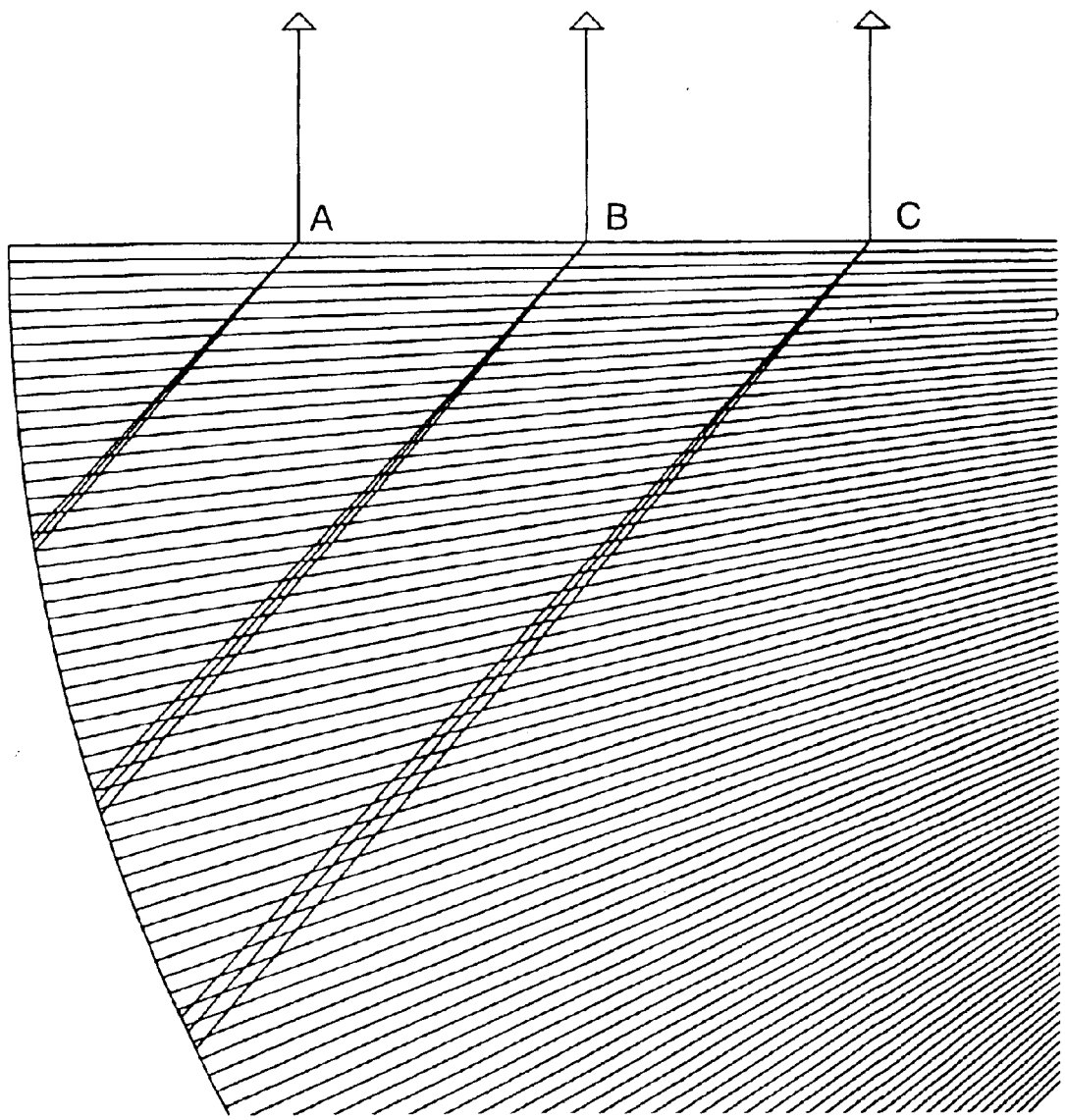
FIG. 5 is a diagram similar to FIG. 4 further illustrating the principles of the present invention.

The present invention considers multiple prism configurations in a contiguous turning lens and the effect of such structures on optical output uniformity. For example, the turning film may have clusters of 3 prism configurations each with a prism angle of 68.88, but having different prism axis orientations of −1.5°, 0° and +1.5° relative to the turning lens normal. Three rays drawn from an observer, one into each prism of a cluster, would trace back through the unfolded light diagram to different positions on the input surface. Referring to FIG. 5, three locations "A", "B" and "C" are illustrated on the output surface of the wedge. At each location a pencil of 3 rays is drawn from the output surface to the fan of the input surface pupils. As observed in FIG. 5, the pencil of rays covers a full pupil width even from position "A", which would be nearest to the lamp end. Thus, there is provided close-packed sampling of the pupil that results in a smoothing of the local display brightness. The optimal design of the prism configuration would depend upon details of the wedge geometry and optical index.

So far the clusters 43 of prisms have been described as having a substantially similar configuration. That is, the same number of prism having the same distribution of prism configurations. This is not a requirement, and the clusters 43 may vary in configuration. This arrangement may reduce the possibility that at certain locations and for certain angles aperture sampling may occur at very nearly identical aperture locations, although at slightly different input angles. This could lead to localized interference type of patterns similar to ripple.

The prism angles can range from 30°–120°, but may be from 40°–75° and may further be from 60°–75°. The angular difference between prisms within a cluster may be about 1°–10° and may further be about 1°–5°. The spacing of the prisms, i.e., the prism pitch, as discussed should be less than the spatial frequency of the ripple and may be anywhere from 1 $\mu$m–1000 $\mu$m, and may still be 20 $\mu$m–100 $\mu$m and may further be 30 $\mu$m–50 $\mu$m. The array pitch for the array 36, with 50 $\mu$m prism pitch, may be approximately 150 $\mu$m. The prism configurations are also influenced by the refractive index of the optically transmissive film due to the effects on the refraction face and the TIR at the reflection face. Typical film material may have an index in the range of 1.35–1.75. For example, for a polycarbonate material with an index of 1.586, and a lightguide with a nominal light exit (glancing) angle of 13°, a prism configuration with a nominal included angle of 68.9° may be used.

Figure 6:
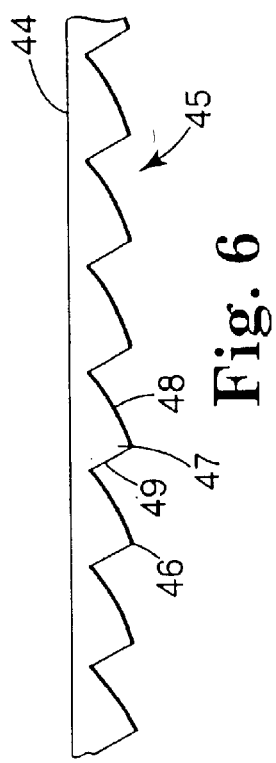
FIG. 6 is a schematic illustration of a turning film constructed in accordance with still another alternate preferred embodiment of the present invention.

Referring now to FIG. 6, a turning film 44 formed in accordance with an alternate embodiment of the invention includes an array of prisms 45 on an input surface 46. The array of prisms 45 has prisms 47 of at least a first configuration and a second configuration for providing a ripple reducing effect. Furthermore, the prisms 47 are formed with a curved facet reflective side 48. A prism angle is defined as between a tangent to the reflective side 48 and the refractive side 49. As described above with respect to the array 36, to reduce the ripple effect the prisms are arranged in clusters within the array 44. Within the clusters, the prism angles may vary and/or the prism orientation, i.e., the angle the prism axis makes to normal, may vary. It should be appreciated that both surfaces may be formed to have a curved facet configuration.

Films including an array of prisms, such as the arrays 36, 36' or 44, may be formed by extrusion or by a cast and cure process. A master is first made by diamond turning the array structure into a surface of a cylindrical blank, or roll. One technique for forming the array structure in the surface is known as thread cutting. A first thread is cut the length of the roll, and the first thread corresponds to the first prism configuration. Starting at a position adjacent the first thread a second thread is cut. The second thread is cut using a different cutting tool or by after adjusting the cutting tool in order to produce the second prism configuration. This process is repeated, changing cutting tools and/or using multiple tools, until all of the desired prism configurations are formed.

Alternatively, using an adjustable cutting tool, the tool may be adjusted during the thread cutting process. A single thread is cut, and the tool is continuously rotated during the cutting process to continuously vary the prism configuration such that prisms are formed within the array having differing prism configurations.

Still another alternative is to plunge cut the prism configurations. Plunge cutting may be accomplished using multiple cutting tools, one each for each prism configuration. An adjustable cutting tool may be used and the tool adjusted for cutting each prism configuration.

Another forming possibility includes the use of a fast tool servo (FTS) actuator. An FTS actuator is shown and described in the commonly assigned U.S. patent application Ser. No. 09/543,304 entitled "Optical Film" and U.S. patent application Ser. No. 09/246,970 entitled "Optical Film With Defect-Reducing Surface and Method of Making Same" the disclosures of which are hereby expressly incorporated herein by reference. The FTS advantageously allows for the incorporation of anti-wetout and/or other properties into the array 36 as described in the afore-mentioned US patent applications. Wet-out is an optical defect that appears when two adjacent optical surfaces within the display device come into contact with one another. To prevent wet-out, and as discussed in the aforementioned US patent applications, randomly distributed peaks and valleys, local maxima and minima, may be formed on one or both adjacent surfaces to minimize the amount and regularity of contact between the adjacent surface. Thus, the input surface 28 of the first light redirecting element 26 may be formed to include anti wet-out structure as may the output surface 30.

Figure 7:
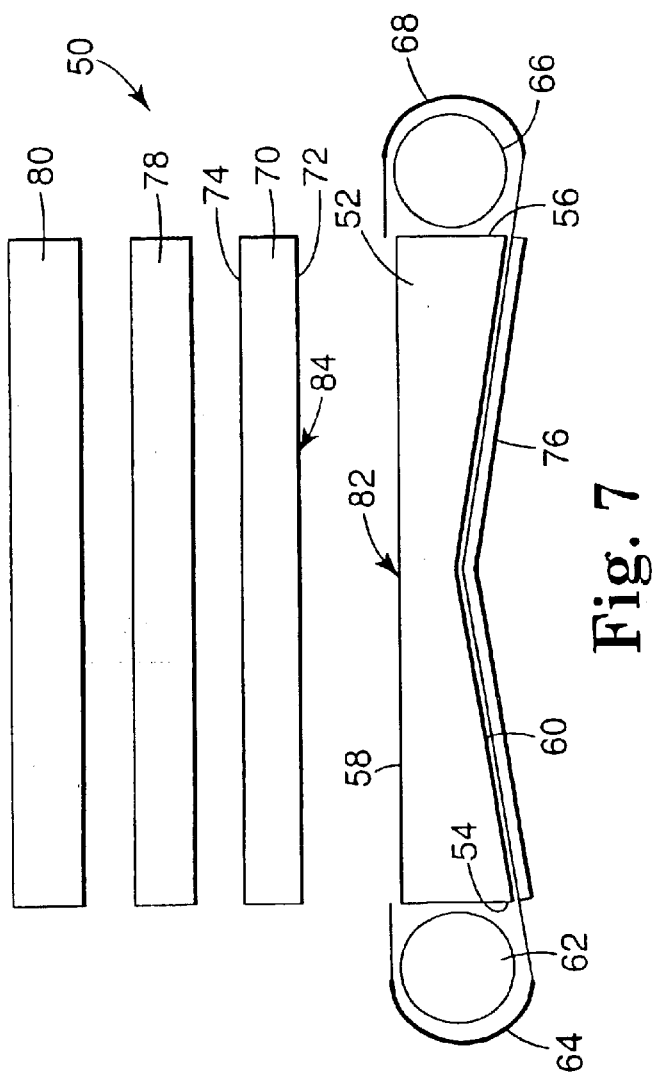
FIG. 7 is a schematic illustration of an illumination device adapted in accordance with an alternate preferred embodiment of the invention.

Referring now to the illumination device 50 illustrated in FIG. 7, a lightguide 52 forms a portion of the illuminating device 50 and includes a first entrance surface 54, a second entrance surface 56, an output surface 58 and a back surface 60. A first light source 62 includes a first light source reflector 64 and couples to the first entrance surface 54. A second light source 66 includes a second light source reflector 68 and couples to the second entrance surface. Disposed adjacent the output surface 58 is a first light redirecting element 70. The first light redirecting element 70 includes an input surface 72 and an output surface 74. The illumination device 50 further includes a reflector 76 adjacent the back surface 60, a second light redirecting element 78 and a reflective polarizer 80. The lightguide 52 may be a wedge or modification thereof. As is well known, the purpose of the lightguide 50 is to efficiently spread light from both light sources 62 and 66 over an area much larger than the sources themselves, and more particularly, substantially over an entire area formed by output surface 58.

The first light redirecting element 70 is preferably a light transmissive film the input surface 72 of which is formed with an array of prisms in a manner similar to that described above with respect to the array 36 of the first light redirecting element 26. As the illumination device 50 has a light source disposed on opposite ends thereof, the prisms forming the array may be configured symmetrically or asymmetrically and with differing prism angles. This is to ensure that light rays entering the lightguide 52 from either entrance surface 54 and 56 are turned along a desired viewing axis. The array of prisms act to redirect the light output from the lightguide 52 along a preferred viewing direction, and further act to reduce the perception of ripple.

As a result of illuminating the lightguide 52 from two sides, an optical defect caused by the light rays entering from the opposite entrance surface 54 and 56 may occur at a center portion 82 of the lightguide 52. The array of prisms formed on the input surface 72 of the light redirecting structure 70 may be altered at a corresponding center portion 84 to reduce this perceived optical defect in a manner similar to that by which the array reduces perceived ripple.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An optical turning film comprising:
   a first surface;
   an array of prisms formed in the first surface, wherein the array of prisms has:
   a plurality of first prisms, each of the first prisms having a first prisms reflecting surface and a first prisms refracting surface and a first prism included angle between the first prisms reflecting surface and the first prisms refracting surface;
   a plurality of second prisms, each of the second prisms having a second prisms reflecting surface and a second prisms refracting surface and a second prisms included angle between the first prisms reflecting surface and the first prisms refracting surface, different than the first prisms included angle; and
   a second surface opposing the first surface.

2. The optical turning film as recited in claim 1, wherein the plurality of first prisms and the plurality of second prisms are arranged in clusters within the array.

3. The optical turning film as recited in claim 1, wherein the plurality of first prisms comprise at least one group of first prisms having the first prism included angle and the plurality of second prisms comprise at least one group of second prisms having the second prisms included angle and being formed in the first surface adjacent the at least one group of first prisms.

4. The optical turning film as recited in claim 1, wherein the first prisms included angle and the second prisms included angle are in the range from 30° to 120°.

5. The optical turning film as recited in claim 1, wherein the array comprises a transition between one of the plurality of first prisms and one of the plurality of second prisms, the transition comprising a substantially continuous angular reconfiguration from the first prism angular orientation to the second prism angular orientation.

* * * * *